United States Patent
Ota et al.

(10) Patent No.: US 7,254,544 B2
(45) Date of Patent: Aug. 7, 2007

(54) SPEECH PROCESSING UNIT WITH PRIORITY ASSIGNING FUNCTION TO OUTPUT VOICES

(75) Inventors: Masako Ota, Tokyo (JP); Kazuhiro Yokouchi, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 918 days.

(21) Appl. No.: 10/358,185

(22) Filed: Feb. 5, 2003

(65) Prior Publication Data

US 2003/0154079 A1 Aug. 14, 2003

(30) Foreign Application Priority Data

Feb. 13, 2002 (JP) ............................. 2002-035872

(51) Int. Cl.
*G10L 15/00* (2006.01)
(52) U.S. Cl. ..................... 704/275; 704/274; 704/270
(58) Field of Classification Search ............... None
See application file for complete search history.

(56) References Cited

U.S. PATENT DOCUMENTS 6,067,521 A * 5/2000 Ishii et al. ................... 704/275
6,385,582 B1 * 5/2002 Iwata ........................... 704/270
6,708,150 B1 * 3/2004 Hirayama et al. ........... 704/243

FOREIGN PATENT DOCUMENTS

| DE | 699 00 981 T2 | 2/2001 |
| DE | 100 40 466 A1 | 3/2002 |
| JP | 62-105198 | 5/1987 |
| JP | 63-095532 | 4/1988 |
| JP | 05-323993 | 12/1993 |
| JP | 08-146991 | 6/1996 |
| JP | 11-015496 | 1/1999 |
| JP | 2000-322098 A | 11/2000 |

* cited by examiner

*Primary Examiner*—David D. Knepper
(74) *Attorney, Agent, or Firm*—Birch, Stewart, Kolasch & Birch, LLP

(57) ABSTRACT

A speech processing unit assigns priority either to voice guidance processing or to speech recognition processing to be carried out previously, when a speech input requesting for the speech recognition processing is accepted while the voice guidance processing is being carried out. It can solve a problem of a conventional speech processing unit in that when a user operates a speech input button requesting for the speech recognition processing, the currently output voice guidance is interrupted, or the voice guidance scheduled to be output is not produced, thereby hindering the user from obtaining truly necessary information.

11 Claims, 4 Drawing Sheets

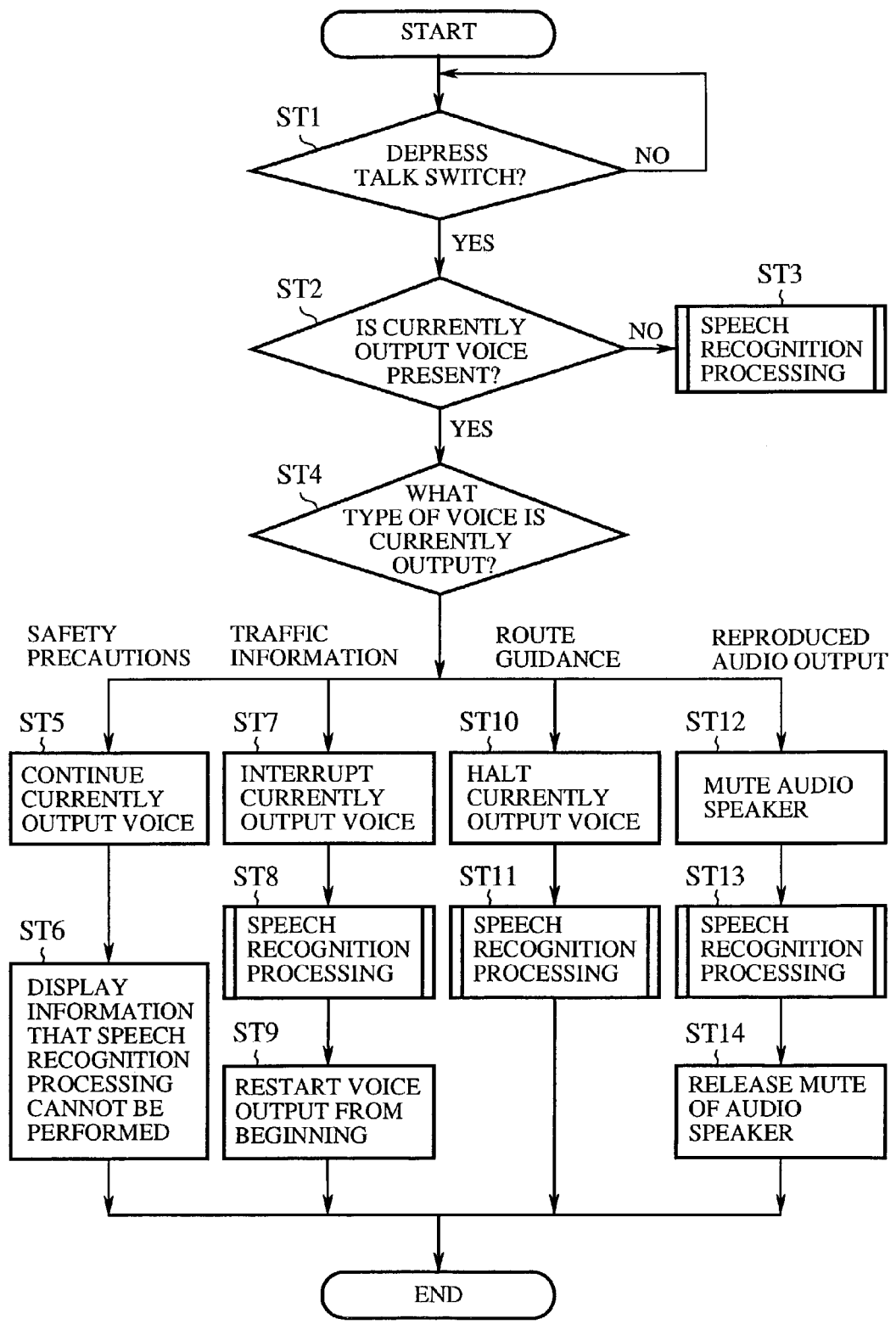

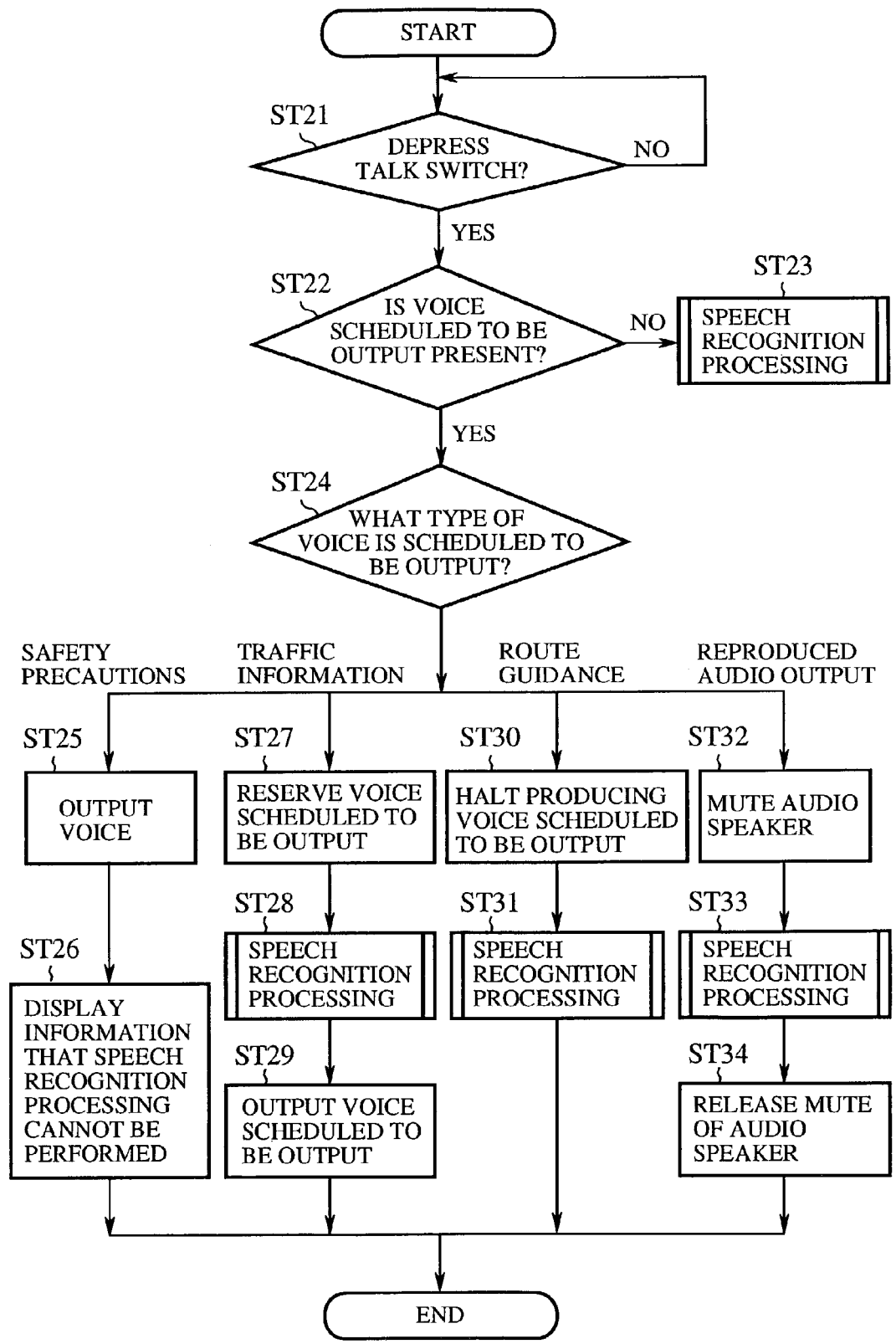

SPEECH PROCESSING UNIT WITH PRIORITY ASSIGNING FUNCTION TO OUTPUT VOICES

BACKGROUND OF THE INVENTION

1. Field of the Invention

The present invention relates to a speech processing unit installed in a navigation system to carry out voice guidance and speech recognition.

2. Description of Related Art

Some conventional navigation systems can carry out destination setting or institution search not only by operating a remote control or mechanical switches like touch switches, but also by means of accepting a speech input and performing speech recognition.

For example, Japanese patent application laid-open No. 2000-322098 discloses a speech processing unit for a navigation system that devises the following method to increase the speech recognition reliability.

When a user operates a speech input button to request acceptance of a speech input, the speech processing unit silences output sounds from car audio equipment so that it does not detect its music or the like as noise.

With the foregoing configuration, the conventional speech processing unit can improve the recognition reliability of the input voice at the cost of the output sounds from a peripheral device such as the audio equipment, when the user operates the speech input button. Accordingly, it has a problem in that the currently output voice guidance is interrupted, or the voice guidance to be output is not actually output, thereby preventing the user from obtaining truly necessary information.

SUMMARY OF THE INVENTION

The present invention is implemented to solve the foregoing problem. It is therefore an object of the present invention to provide a speech processing unit capable of providing a user with important information reliably even when the speech input is carried out.

According to one aspect of the present invention, there is provided a speech processing unit including a processing controller for assigning priority either to the processing of a voice guidance section or to the processing of a speech recognition section to be carried out previously, when the speech recognition section accepts the speech input while the voice guidance section is carrying out or scheduling the voice guidance processing.

BRIEF DESCRIPTION OF THE DRAWINGS

FIG. 3 is a flowchart illustrating a speech processing method of the embodiment 1 in accordance with the present invention; and FIG. 4 is a flowchart illustrating a speech processing method of an embodiment 2 in accordance with the present invention.

DETAILED DESCRIPTION OF THE PREFERRED EMBODIMENTS

The embodiments in accordance with the invention will now be described with reference to the accompanying drawings.

Embodiment 1

Figure 1:
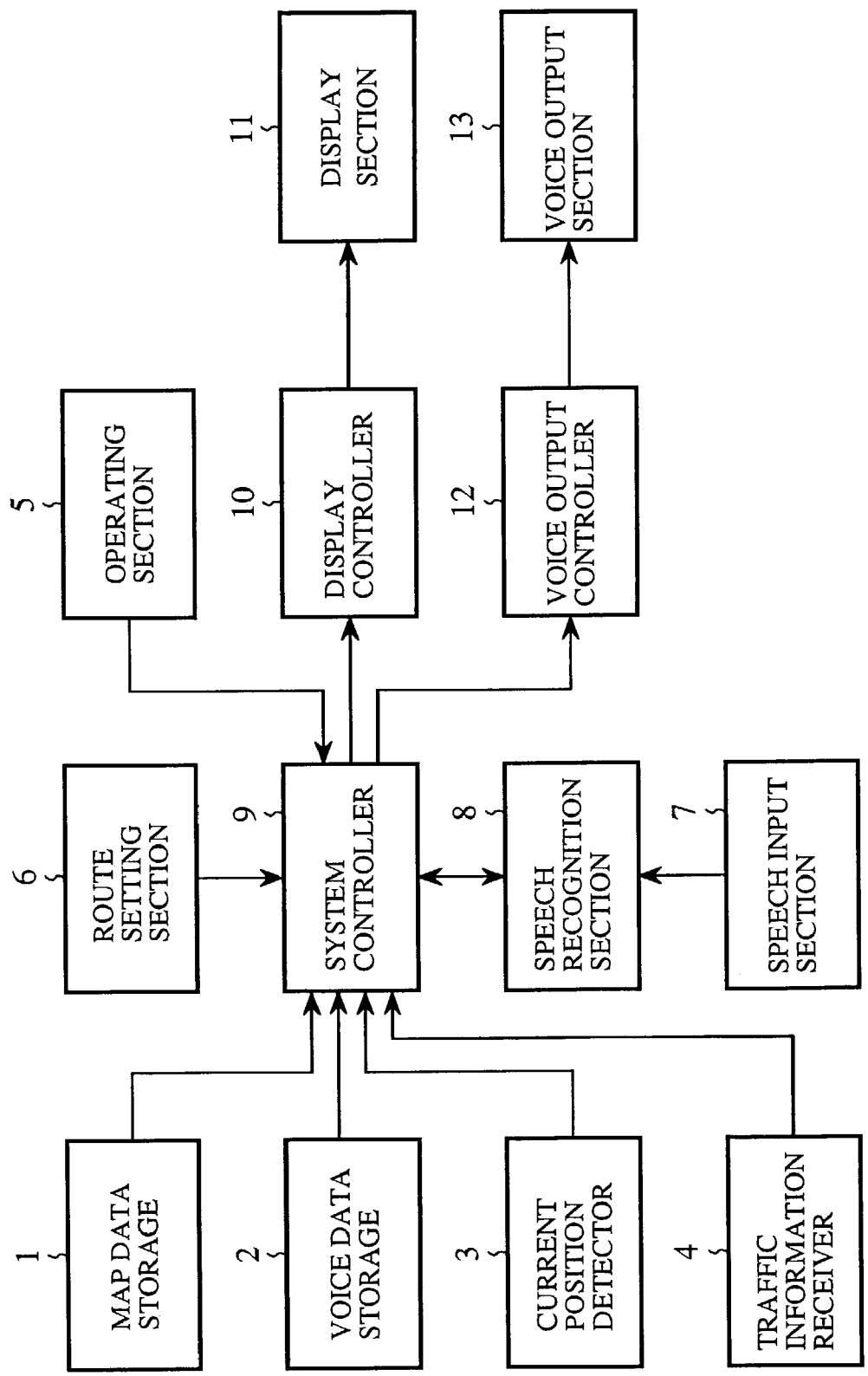
FIG. 1 is a block diagram showing a functional configuration of a navigation system to which an embodiment 1 of the speech processing unit in accordance with the present invention is applied.

FIG. 1 is a block diagram showing a functional configuration of a navigation system to which an embodiment 1 of the speech processing unit in accordance with the present invention is applied. In FIG. 1, the reference numeral 1 designates a map data storage for storing map data indicating road information about roads for traveling vehicle; and 2 designates a voice data storage for storing voice guidance messages for directing the travel of the vehicle. The voice guidance messages are divided into fixed type messages stored in accordance with the types of the voice guidance, and word type messages with concrete values such as distances and place names. Combining the fixed type and word type messages can produce desired messages.

The reference numeral 3 designates a current position detector for detecting the current position of the vehicle by reading the output data of a GPS receiver and various sensors; 4 designates a traffic in formation receiver for receiving traffic information; 5 designates an operating section for accepting route setting for a destination and other various operations of a user; 6 designates a route setting section for searching for a route to the destination set by the operating section 5; 7 designates a speech input section for inputting user's speech; and 8 designates a speech recognition section for carrying out speech recognition by searching a speech recognition dictionary for the input speech.

Incidentally, the speech input section 7 and speech recognition section 8 constitute a speech recognition means.

The reference numeral 9 designates a system controller for generating a route guidance image by reading various data, for example, and for generating a voice guidance message for making voice guidance suitable for the current situation. The system controller 9 controls the entire system, and particularly controls which processing of the voice output controller 12 and speech recognition section 8 is to be assigned priority when the speech input section 7 accepts a speech input while the voice output controller 12 is carrying out voice guidance processing.

The reference numeral 10 designates a display controller for generating display signals for displaying a road map, current position mark, destination mark and the like under the control of the system controller 9; 11 designates a display section for displaying the road map, current position mark, destination mark and the like in response to the display signals supplied from the display controller 10; 12 designates a voice output controller for controlling the output of the speech under the control of the system controller 9; and 13 designates a voice output section for outputting the voice in response to the control of the voice output controller 12.

Incidentally, the system controller 9, voice output controller 12 and voice output section 13 constitute a voice guidance means.

Figure 2:
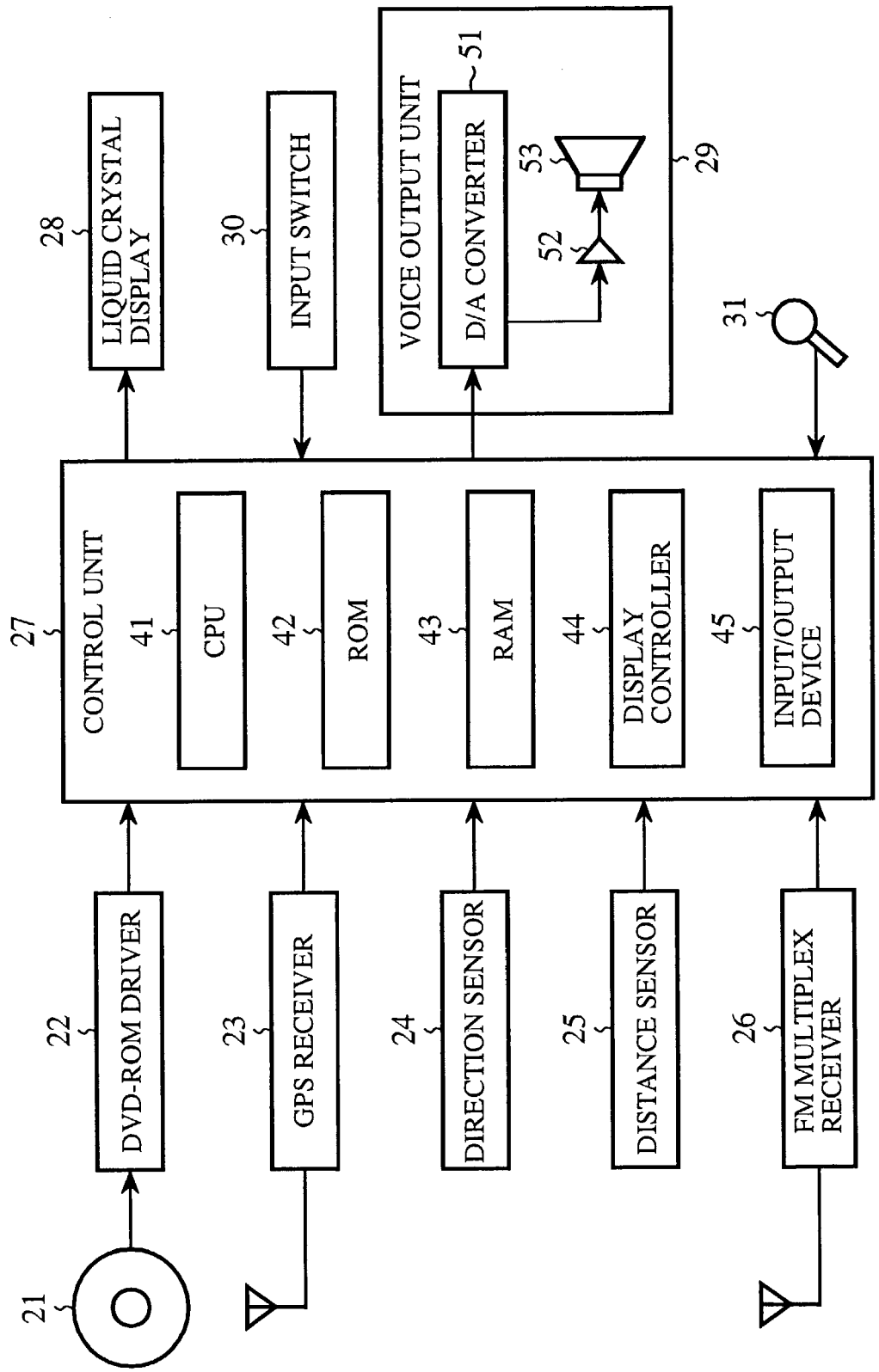
FIG. 2 is a block diagram showing a hardware configuration of the navigation system of FIG. 1.

FIG. 2 is a block diagram showing a hardware configuration of the navigation system of FIG. 1. In FIG. 2, the reference numeral 21 designates a DVD-ROM corresponding to the map data storage 1 and voice data storage 2; 22 designates a DVD-ROM driver for driving the DVD-ROM 21; 23 designates a GPS receiver for receiving radio waves from GPS satellites to detect the current position of the vehicle; 24 designates a direction sensor for detecting the direction of the vehicle; and 25 designates a distance sensor for detecting the distance the vehicle travels. The GPS receiver 23, direction sensor 24 and distance sensor 25 corresponds to the current position detector 3.

The reference numeral 26 designates an FM multiplex receiver corresponding to the traffic information receiver 4; and 27 designates a control unit for carrying out various calculations and control of the entire system. The control unit 27 achieves the functions of the system controller 9, route setting section 6, display controller 10, voice output controller 12 and speech recognition section 8 of FIG. 1. The reference numeral 28 designates a liquid crystal display for displaying the display data supplied from the control unit 27. It corresponds to the display section 11. The reference numeral 29 designates a voice output unit for producing the speech. It corresponds to the voice output section 13. The reference numeral 30 designates an input switch like a remote control and touch switch for supplying instructions such as inputting a destination and changing the screen of the display section 11. The operating section 5 is one of the functions of the input switch 30. The reference numeral 31 designates a microphone for the user to input speech. It corresponds to the speech input section 7.

The reference numeral 41 designates a central processing unit (CPU) of the control unit 27; 42 designates a ROM; 43 designates a RAM; 44 designates a display controller for carrying out display control of the liquid crystal display 28; and 45 designates an input/output (I/O) device for carrying out input and output between the control unit 27 and the outside.

The reference numeral 51 designates a digital-to-analog converter (D/A converter) for converting a voice guidance message read in the form of digital signal data into an analog signal; 52 designates an amplifier for amplifying the voice converted into the analog signal; and 53 designates a speaker for outputting the amplified voice.

Next, the operation of the present embodiment 1 will be described with reference to FIG. 3, a flowchart illustrating the speech processing of the present embodiment 1 in accordance with the present invention.

First, the system controller 9 makes a decision as to whether the user depresses a talk switch or not for making a speech input (step ST1).

The talk switch is one of the switches of the operating section 5, and is depressed when the user inputs speech to notify the system of the speech input for the speech recognition.

Detecting the depression of the talk switch, the system controller 9 makes a decision as to whether the voice output section 13 is producing any voice now (step ST2).

When no speech is being output, the system controller 9 instructs the speech recognition section 8 to carry out the speech recognition processing. Thus, the speech recognition section 8 carries out the speech recognition of the input speech of the user supplied from the speech input section 7 (step ST3).

On the other hand, when the voice is being produced, the system controller 9 decides the type of the currently output voice (step ST4). Specifically, it decides the type of the voice guidance to determine the processing to which the priority is to be assigned.

For example, when the voice guidance currently output is a message about safety such as a curve precaution or deceleration warning (for example, "Curve ahead, reduce the speed"), the system controller 9 prevents the speech recognition section 8 from carrying out the speech recognition processing, thereby continuing the output of the voice guidance (step ST5). In this case, to notify the user that the speech recognition processing cannot be performed, the system controller 9 sends a command to display the message on the display controller 10 (step ST6). Since this type of the voice guidance is very important and essential for the user, it is assigned the highest priority.

When the type of the voice guidance belongs to the traffic information about a traffic congestion and traffic control, and about the toll information of ETC (electronic toll collection), such as "traffic congestion 1 km ahead" and "toll is 1000 yen", the system controller 9 carries out the following operation. First, it supplies a voice output interruption command to the voice output controller 12 to suspend the voice guidance currently output (step ST7). Then, it causes the speech recognition section 8 to carry out the speech recognition processing of the input voice accepted by the speech input section 7 (step ST8).

Subsequently, after the speech recognition processing of the input voice has been completed, the system controller 9 supplies the voice output controller 12 with a voice output resume command to output the interrupted message again from the beginning (step ST9). Alternatively, it may be resumed from the interrupted point, or output after being edited to a simpler version. Although this type of voice guidance is necessary for the user, it can be delayed without any problem.

When the type of the voice guidance is a message associated with route guidance such as "turn right 500 m ahead", the system controller 9 supplies a voice output halting command to the voice output controller 12. Thus, the system controller 9 controls such that the currently output voice guidance is halted (step ST10), and causes the speech recognition section 8 to carry out the speech recognition processing of the input voice accepted by the speech input section 7 (step ST11). This is because although this type of voice guidance is necessary for the user, if its output is delayed, the user may lose the guided location because the guidance includes information about the distance and the like. In addition, the operation of the talk switch by the user suggests that it is reasonable for the system controller 9 to make a decision that the user wishes the operation in accordance with the speech recognition rather than the route guidance by voice.

When the voice guidance is associated with a reproduced audio output such as music, the system controller 9 mutes the audio speaker (when the voice output section 13 shares the function of the audio speaker, it mutes the voice output section 13) (step ST12). Then, the system controller 9 causes the speech recognition section 8 to carry out the speech recognition processing of the input voice accepted by the speech input section 7 (step ST13).

Subsequently, after the speech recognition processing of the input voice has been completed, the mute of the audio speaker is released (step ST14).

As described above, the present embodiment 1 is configured such that when the speech recognition processing is required by the voice input while the voice guidance processing is being carried out, one of the voice guidance processing and the speech recognition processing is assigned priority to be carried out previously. Accordingly, the present embodiment 1 offers an advantage of being able to provide important information without fail even when the speech input is carried out.

Although the present embodiment 1 automatically decides the priority of the voice guidance processing and speech recognition processing, this is not essential. For example, a configuration is also possible in which the user can set the priority freely.

Embodiment 2

When the speech recognition processing is required by the speech input while the voice guidance processing is being carried out, the foregoing embodiment 1 selects the processing that is assigned priority to be performed previously. This, however, is not essential. For example, when the speech recognition processing is required by the speech input while the voice guidance processing is scheduled to be carried out, the processing that is assigned priority to be carried out previously can be selected as shown in FIG. 4.

This is implemented as follows.

First, the system controller 9 makes a decision as to whether the user depresses a talk switch or not for making a speech input (step ST21).

Detecting the depression of the talk switch, the system controller 9 makes a decision as to whether or not any voice message is scheduled to be output from the voice output section 13 (step ST22). For example, a decision is made as to whether the voice output section 13 is scheduling to produce a voice message within a certain time period such as 15 seconds or 300 milliseconds.

When no speech is scheduled to be output, the system controller 9 instructs the speech recognition section 8 to carry out the speech recognition processing. Thus, the speech recognition section 8 carries out the speech recognition of the input voice of the user supplied from the speech input section 7 (step ST23).

On the other hand, when any voice message is scheduled to be output, the system controller 9 decides the type of the voice (step ST24). Specifically, it decides the type of the voice guidance to determine the processing that is given priority.

For example, when the voice guidance scheduled to be output is a message about safety such as a curve precaution or deceleration warning (for example, "Curve ahead, reduce the speed"), the system controller 9 prevents the speech recognition section 8 from carrying out the speech recognition processing, and enables the voice guidance to be output (step ST25). In this case, to notify the user that the speech recognition processing cannot be performed, the system controller 9 sends to the display controller 10 a command to display the notification (step ST26).

When the type of the voice guidance belongs to the traffic information about a traffic congestion and traffic control, and about the toll information of ETC, such as "traffic congestion 1 km ahead", "toll is 1000 yen", the system controller 9 carries out the following operation. First, it supplies a voice output reservation command to the voice output controller 12 to withhold the voice guidance scheduled to be output (step ST27). Then, it causes the speech recognition section 8 to carry out the speech recognition processing of the input voice accepted by the speech input section 7 (step ST28).

Subsequently, after the speech recognition processing of the input voice has been completed, the system controller 9 supplies the voice output controller 12 with a voice output start command to output the reserved message (step ST29).

When the type of the voice guidance is associated with route guidance such as "turn right 500 m ahead", the system controller 9 supplies a voice output halting command to the voice output controller 12 to halt the voice guidance scheduled to be output (step ST30), and causes the speech recognition section 8 to carry out the speech recognition processing of the input voice accepted by the speech input section 7 (step ST31). This is because the voice guidance associated with the route guidance is usually output several times in accordance with the distance rather than only once.

When the voice guidance is associated with a reproduced audio output such as music, the system controller 9 mutes the audio speaker (when the voice output section 13 shares the function of the audio speaker, it mutes the voice output section 13) (step ST32). Then, the system controller 9 causes the speech recognition section 8 to carry out the speech recognition processing of the input voice accepted by the speech input section 7 (step ST33).

Subsequently, after the speech recognition processing of the input voice has been completed, the mute of the audio speaker is released (step ST34).

As described above, the present embodiment 2 is configured such that when the speech recognition processing is required by the speech input while the voice guidance processing is scheduled to be carried out, one of the voice guidance processing and the speech recognition processing is assigned priority to be carried out previously. Accordingly, the present embodiment 2 offers an advantage of being able to provide important information without fail even when the speech input is carried out.

Although the present embodiment 2 automatically decides the priority of the voice guidance processing and speech recognition processing, this is not essential. For example, a configuration is also possible in which the user can set the priority freely.

What is claimed is:

1. A speech processing unit comprising:
   voice guidance device for carrying out voice guidance processing in response to conditions associated with a vehicle navigation;
   speech recognition device for carrying out speech recognition processing by accepting a speech input; and
   processing control device for assigning priority to one of processing of said voice guidance device and processing of said speech recognition device to be carried out previously, when said speech recognition device accepts the speech input while said voice guidance device is carrying out or scheduling the voice guidance processing, where priority is given to the processing of the voice guidance device if the conditions have been designated as important where priority is otherwise given to the speech recognition processing.

2. The speech processing unit according to claim 1, wherein said processing control device decides the processing to be carried out previously considering a type of the voice guidance.

3. The speech processing unit according to claim 2, wherein if the voice guidance is associated with safety precautions when said speech recognition device accepts the speech input while said voice guidance device is carrying out the voice guidance processing, said processing control device has the voice guidance processing continued and the speech recognition processing canceled.

4. The speech processing unit according to claim 2, wherein if the voice guidance is associated with one of traffic information and toll information when said speech recognition device accepts the speech input while said voice guidance device is carrying out the voice guidance processing, said processing control device has the voice guidance processing suspended for a time and the speech recognition processing carried out.

5. The speech processing unit according to claim 2, wherein if the voice guidance is associated with route guidance when said speech recognition device accepts the speech input while said voice guidance device is carrying out the voice guidance processing, said processing control device has the voice guidance processing halted and the speech recognition processing carried out.

6. The speech processing unit according to claim 2, wherein if the voice said voice guidance device outputs is reproduced audio output when said speech recognition device accepts the speech input while said voice guidance device is carrying out the voice guidance processing, said processing control device has an audio speaker muted and the speech recognition processing carried out.

7. The speech processing unit according to claim 2, wherein if the voice guidance is associated with safety precautions when said speech recognition device accepts the speech input while said voice guidance device is scheduling to carry out the voice guidance processing, said processing control device has the speech recognition processing canceled.

8. The speech processing unit according to claim 2, wherein if the voice guidance is associated with one of traffic information and toll information when said speech recognition device accepts the speech input while said voice guidance device is scheduling to carry out the voice guidance processing, said processing control device has the voice guidance processing postponed and the speech recognition processing carried out.

9. The speech processing unit according to claim 2, wherein if the voice guidance is associated with route guidance when said speech recognition device accepts the speech input while said voice guidance device is scheduling to carry out the voice guidance processing, said processing control device has the voice guidance processing halted and the speech recognition processing carried out.

10. The speech processing unit according to claim 2, wherein if the voice said voice guidance means outputs is reproduced audio output when said speech recognition device accepts the speech input while said voice guidance device is scheduling to carry out the voice guidance processing, said processing control device has an audio speaker muted and the speech recognition processing carried out.

11. A method of information processing, comprising:

processing and outputting verbal information via at least one speaker to a user;

recognizing inputted speech of a user and processing the speech; and controlling the processing and outputting of the verbal information and the inputted speech of a user by determining, based on the predetermined importance of the outputted verbal information, whether processing of the outputted information is performed until completion or is stopped when inputted speech is recognized.

* * * * *